UNITED STATES PATENT OFFICE.

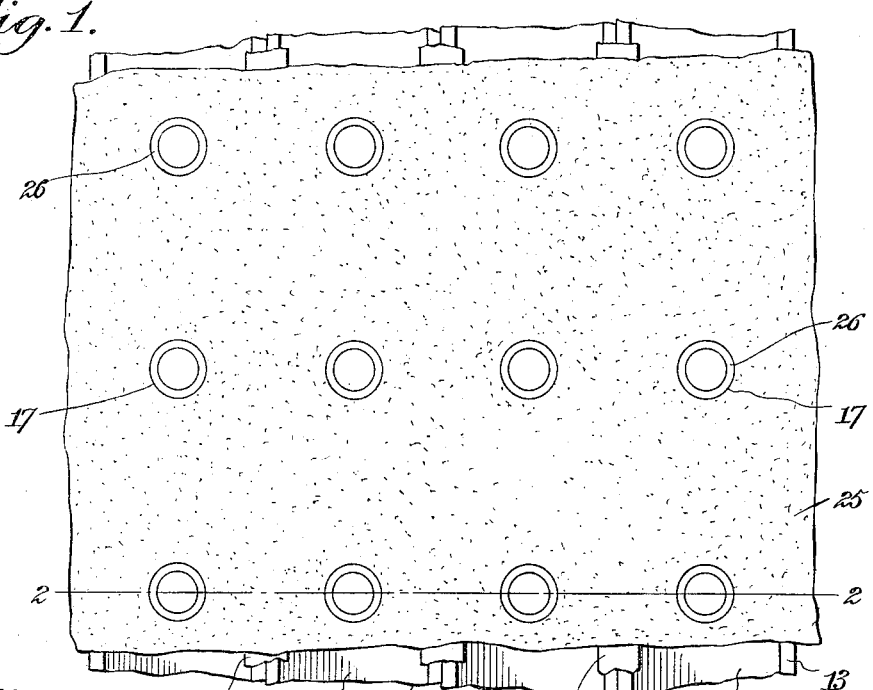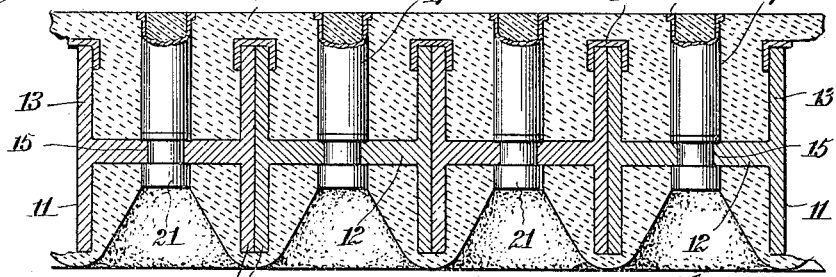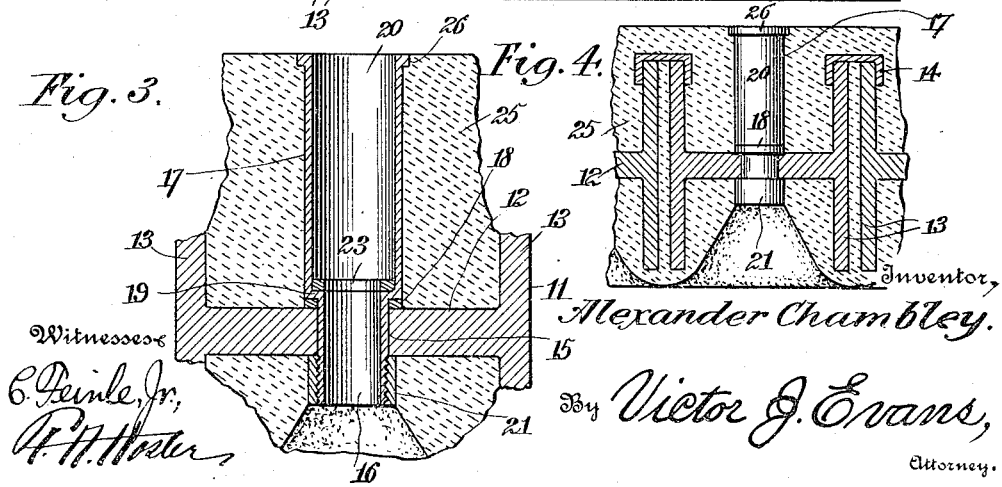

ALEXANDER CHAMBLEY, OF PHILADELPHIA, PENNSYLVANIA.

VAULT-LIGHT CONSTRUCTION.

1,205,160.  Specification of Letters Patent.  Patented Nov. 21, 1916.

Application filed February 9, 1915. Serial No. 7,087.

*To all whom it may concern:*

Be it known that I, ALEXANDER CHAMBLEY, a citizen of the United States, residing at Philadelphia, in the county of Philadelphia and State of Pennsylvania, have invented new and useful Improvements in Vault-Light Construction, of which the following is a specification.

The invention relates to vault light constructions and has for an object to provide a construction for use in sidewalks, walls, platforms or other places where it is desired to permit of the transmission of light into a vault, closet, basement or other underground passage or the like.

To this end the invention consists more essentially of a vault light construction which in its structural arrangement possesses great strength; will present a neat and effective appearance, and which can be readily arranged and secured in a desired position to effectually and properly seat and secure the usual lenses for use with constructions of this character.

In the further disclosure of the invention reference is to be had to the accompanying drawings, constituting a part of this specification, in which similar characters of reference denote corresponding parts in all the views, and in which:

Figure 1 is a fragmentary plan view of the vault light construction; Fig. 2 is a fragmentary vertical sectional view taken substantially on the line 2—2 in Fig. 1; Fig. 3 is a fragmentary enlarged detail view, the lens being shown removed; Fig. 4 is a fragmentary vertical sectional view of a slightly modified form of vault light construction.

Referring more particularly to the views, the preferred form of vault light construction, shown in Figs. 1, 2 and 3, consists of a frame 10 preferably formed of connected sections 11, each section being in the nature of I-beam formations, thus providing horizontal webs 12 and vertical flanges 13, with the flanges projecting upwardly and downwardly from the webs. The ends of adjacent sections 11 are preferably connected by a channel-like member 14 in the nature of a cap, which fits over the upwardly extending end flanges of each section to bind the adjacent sections together.

In each web there is provided one or more openings 15 and through each opening is arranged to pass the lower reduced end 16 of a tubular sleeve 17, a gasket or seat 18 being arranged to encircle the inner portion of the reduced end and fit against an annular flange 19 formed by the enlarged portion 20 of the sleeve, said gasket furthermore seating upon the web, with the lower end of the reduced portion of the tubular sleeve projecting downwardly beyond the web after passing through the opening 15 therein, and threaded to receive a suitable binding collar 21, which, abutting against the under side of the web when screwed up on the reduced portion of the sleeve, will tend to slightly compress the seat or gasket 18, thus providing an effective and water-tight joint where the reduced portion of the sleeve passes through the web. A similar seat or gasket 22 is arranged within the sleeve, in the enlarged or upper portion 23 thereof, and reposes upon an inner horizontal ledge 24 formed by reducing the lower portion of the sleeve, the usual glass lens generally employed in vault light constructions being arranged in the sleeve 17 as clearly shown and reposing upon the gasket or seat 22, as clearly set forth in Fig. 2.

In order to strengthen the frame 10 and effectually cover the metallic parts thereof, the webs and flanges 13 of the frame are covered with cement, the covering of cement being indicated by the numeral 25, said covering or bed of cement encircling the sleeve supported on the web without, however, covering the ends of the sleeve. The covering furthermore incloses and aids in rigidly binding the member 14 in position to hold the sections 11 of the frame 10 together and, as clearly shown in Figs. 1 and 2, when the covering of cement has been arranged as mentioned, and which operation may be carried out in a mold or otherwise, the frame 10 will not be visible, being entirely covered by the coating of cement, the ends of the lenses arranged in the sleeves and the ends of the collars for the sleeves together with the upper ends of the sleeves being the only visible parts and which are not covered by the cement.

From the foregoing description it will be seen that with a vault light construction of the character described there is provided a structure which will possess great strength and durability and which will effectively accomplish the purpose for which it is desired, and present a neat and effective appearance.

In Fig. 4 I show a slightly modified form of my invention, and in which instance the frame 10 instead of being formed of connected sections, each of which includes horizontal webs and vertical flanges, consists of individual I-beam sections, with the adjacent flanges of adjacent sections connected and bound together by the members 15 and which project across the upper ends of the adjacent flanges of adjacent sections. It will be noted, however, that in this construction the adjacent flanges of adjacent sections are not arranged to abut face to face but have a space formed therebetween, said space being filled by some of the cement forming the covering for the frame. The sleeve 17 together with its gaskets or seats 18 and 22, the collar 21 and the lens, shown in Fig. 2, being all substantially the same in the use of the modified form disclosed. The upper end of the sleeve 17 in both forms of the invention is preferably formed with an annular rim 26 as clearly shown in the views, said rim greatly adding to the strength of the sleeve and affording a protection for the lens carried within the sleeve.

Having thus described my invention, I claim:

1. In vault light constructions, a plurality of I beams associated together with head and foot flanges substantially abutting with the webs lying in a horizontal plane, means for connecting the head and foot flanges of the joining I beams, lens receiving tubes mounted in the webs, said I beams forming concrete receiving pockets and concrete in said pockets surrounding the lens receiving tubes.

2. In vault light constructions, a plurality of I beams arranged side by side with head and foot flanges abutting and with webs lying in a horizontal common plane, longitudinal clips connecting the head and foot flanges of the joining I beams, said I beams forming concrete receiving pockets above and below the webs, lens receiving tubes secured within the webs and projecting above the upper edges of the flanges, lenses therein, and concrete surrounding said tubes and embedded in the pockets.

3. In combination with a horizontal webbing having an opening, of a lens tube having a reduced lower end inserted through the opening of said web, said tube having exterior and interior shoulders, a gasket embracing the reduced end of the tube, means threadedly connected with the reduced end of the tube for compressing the gasket between the web and tube, a second gasket arranged on the interior shoulder of said tube, and a lens supported in between said tube and reposing upon the second mentioned gasket.

4. In a vault light construction, a frame embodying a horizontal connecting portion having an opening, lens supporting sleeves having a reduced end adapted to extend through the opening of the horizontal portion, the forming of the reduced end of the sleeve providing the latter with a horizontal ledge, a gasket carried by the reduced end of the lens supporting sleeves and defined between the horizontal ledge of the sleeve and the confronting face of the horizontal portion of the frame, and means threadedly connected on the reduced end of the lens supporting sleeves for compressing the gasket and establishing a liquid tight joint.

In testimony whereof I affix my signature in presence of two witnesses.

ALEXANDER CHAMBLEY.

Witnesses:
HELEN G. DALEY,
NORMAN J. SMITH.

Copies of this patent may be obtained for five cents each, by addressing the "Commissioner of Patents, Washington, D. C."